(12) United States Patent
Huang

(10) Patent No.: US 9,797,723 B1
(45) Date of Patent: Oct. 24, 2017

(54) DUAL OPPOSING ROTATION GYROSCOPE STABILIZATION SYSTEM

(71) Applicant: Dorge O. Huang, Henry, IL (US)

(72) Inventor: Dorge O. Huang, Henry, IL (US)

( * ) Notice: Subject to any disclaimer, the term of this patent is extended or adjusted under 35 U.S.C. 154(b) by 230 days.

(21) Appl. No.: 14/835,906

(22) Filed: Aug. 26, 2015

Related U.S. Application Data

(60) Provisional application No. 62/121,146, filed on Feb. 26, 2015.

(51) Int. Cl.
  *G01C 19/54* (2006.01)
  *G01C 19/04* (2006.01)

(52) U.S. Cl.
  CPC .................... *G01C 19/04* (2013.01)

(58) Field of Classification Search
  CPC ................ G01C 19/04; G01C 19/06
  See application file for complete search history.

(56) References Cited

U.S. PATENT DOCUMENTS

| | | | | |
|---|---|---|---|---|
| 3,502,062 A * | 3/1970 | Shurts | ........ | F41B 5/1426 124/23.1 |
| 3,526,795 A * | 9/1970 | Pecs | ........ | B64G 1/283 244/165 |
| 3,793,737 A * | 2/1974 | Alth | ........ | G01C 17/00 33/300 |
| 4,021,716 A * | 5/1977 | Rue | ........ | G01C 19/04 244/165 |
| 4,706,389 A * | 11/1987 | Eisenhammer | ........ | G01C 17/00 33/300 |
| 4,848,158 A * | 7/1989 | Egli | ........ | G01P 9/02 244/3.21 |
| 8,220,448 B1 | 7/2012 | Moggo | | |

* cited by examiner

*Primary Examiner* — Jake Cook
(74) *Attorney, Agent, or Firm* — Donald J. Ersler

(57) ABSTRACT

A dual opposing rotation gyroscope stabilization system preferably includes a first rotor, a second rotor, a first motor, a second motor and a frame. The first rotor includes a rotor bore formed in one end and a first outer bearing pressed on to an opposing end. At least one bore bearing is pressed into the rotor bore. The second rotor includes a first outer diameter and a second outer diameter. The second diameter is rotatably retained by the at least one bore bearing. A second outer bearing is pressed on to an end of the first outer diameter. The frame preferably includes a first end plate, a second end plate and at least one lengthwise member. The first end plate retains the first motor and the first outer bearing. The second end plate retains the second motor and the second outer bearing. A second embodiment is submersible.

15 Claims, 5 Drawing Sheets

DUAL OPPOSING ROTATION GYROSCOPE STABILIZATION SYSTEM

CROSS-REFERENCES TO RELATED APPLICATIONS

This is a non-provisional patent application, which claims the benefit of provisional application No. 62/121,146 filed on Feb. 26, 2015.

BACKGROUND OF THE INVENTION

1. Field of the Invention

The present invention relates generally to stabilizers and more specifically to a dual opposing rotation gyroscope stabilization system, which provides gyroscope stabilization in a compact package.

2. Discussion of the Prior Art

U.S. Pat. No. 8,220,448 to Moggo discloses an archery bow stabilizer. However, Moggo does not teach using two rotors, which rotate in opposing directions.

Accordingly, there is a clearly felt need in the art for a dual opposing rotation gyroscope stabilization system, which includes two rotors that rotate in opposite directions for improved stability.

SUMMARY OF THE INVENTION

The present invention provides a dual opposing rotation gyroscope stabilization system, which provides gyroscope stabilization in a compact package. The dual opposing rotation gyroscope stabilization system (dual gyroscope system) preferably includes a first rotor, a second rotor, a first motor, a second motor and a support structure. The first rotor includes an outer diameter and a rotor bore. The rotor bore is formed in one end of the first rotor and a first outer bearing is pressed on to the outer diameter at an opposing end of the first rotor. A first bore bearing is pressed into a bottom of the rotor bore and a second bore bearing is pressed into an opening of the rotor bore. The second rotor includes a first outer diameter that is preferably the same as the outer diameter of the first rotor and a second outer diameter, which is sized to be received by the rotor bore. A second outer bearing is pressed on to an end of the first outer diameter. The first and second rotors are sized, such that the angular momentum of the first rotor is equal to the angular momentum of the second rotor.

The support structure preferably includes a first end plate, a second end plate and at least one lengthwise member. The first end plate includes a first bearing bore formed in one side and an end of the first motor is attached to an opposing side of the first end plate. A first shaft cavity is formed in the opposing end of the first rotor to receive a drive shaft of the first motor. The second end plate includes a second bearing bore formed in one side and an end of the second motor is attached to an opposing side of the second end plate. A second shaft cavity is formed in the end of the second rotor to receive a drive shaft of the second motor. The first end plate is secured to a first end of the at least one lengthwise member and the second end plate is secured to a second end of the at least one lengthwise member. The support structure may be mounted to any object that needs to be stabilized, such as an archery bow.

A second embodiment of a dual gyroscope system preferably includes a first rotor, a second rotor, a first motor, a second motor and a support structure. The support structure preferably includes a first end flange, a second end flange and a support frame. The support frame preferably includes an H-shape. One end of the first and second rotors is pivotally retained by a center of the support frame. An opposing end of the first rotor is pivotally supported by the first end flange. The first end flange is attached to a first end of the support frame with fasteners or the like. An opposing end of the second rotor is pivotally supported by the second end flange. The second end flange is attached to a second end of the support frame with fasteners or the like. A drive end of the first motor is retained on the first end flange. A drive shaft of the first motor is engaged with the opposing end of the first rotor. A drive end of the second motor is retained on the second end flange. A drive shaft of the second motor is engaged with the opposing end of the second rotor.

An electronic control board is attached to an end of the first end flange. A battery tube is sized to retain a battery. A battery end cap is threaded into one end of the battery sleeve. A connection sleeve is used to secure the battery tube to the first end flange. The connection sleeve is sized to receive an outer diameter of the battery tube and an outer diameter of a portion of the first end flange. A motor end cap is threaded into an end of the second end flange. A cover sleeve is sized to receive an outer diameter of the motor end cap and an outer diameter of a portion of the second end flange. The electronic control board includes a reed switch. Power is supplied from the battery to the two motors through the electronic control board. The reed switch acts as an on-off switch. The reed switch is turned-on by holding a magnet adjacent to the location of the reed switch for 2-3 seconds. The electronic control board will not power the two motors, until reed switch has been closed for 2-3 seconds. The first and second rotors are rotated in opposite directions to counterbalance each other.

Accordingly, it is an object of the present invention to provide a dual gyroscope system, which provides gyroscope stabilization in a compact package.

Finally, it is another object of the present invention to provide a dual gyroscope system, which includes two rotors that rotate in opposite directions for improved stability.

These and additional objects, advantages, features and benefits of the present invention will become apparent from the following specification.

DETAILED DESCRIPTION OF THE PREFERRED EMBODIMENTS

Figure 1:
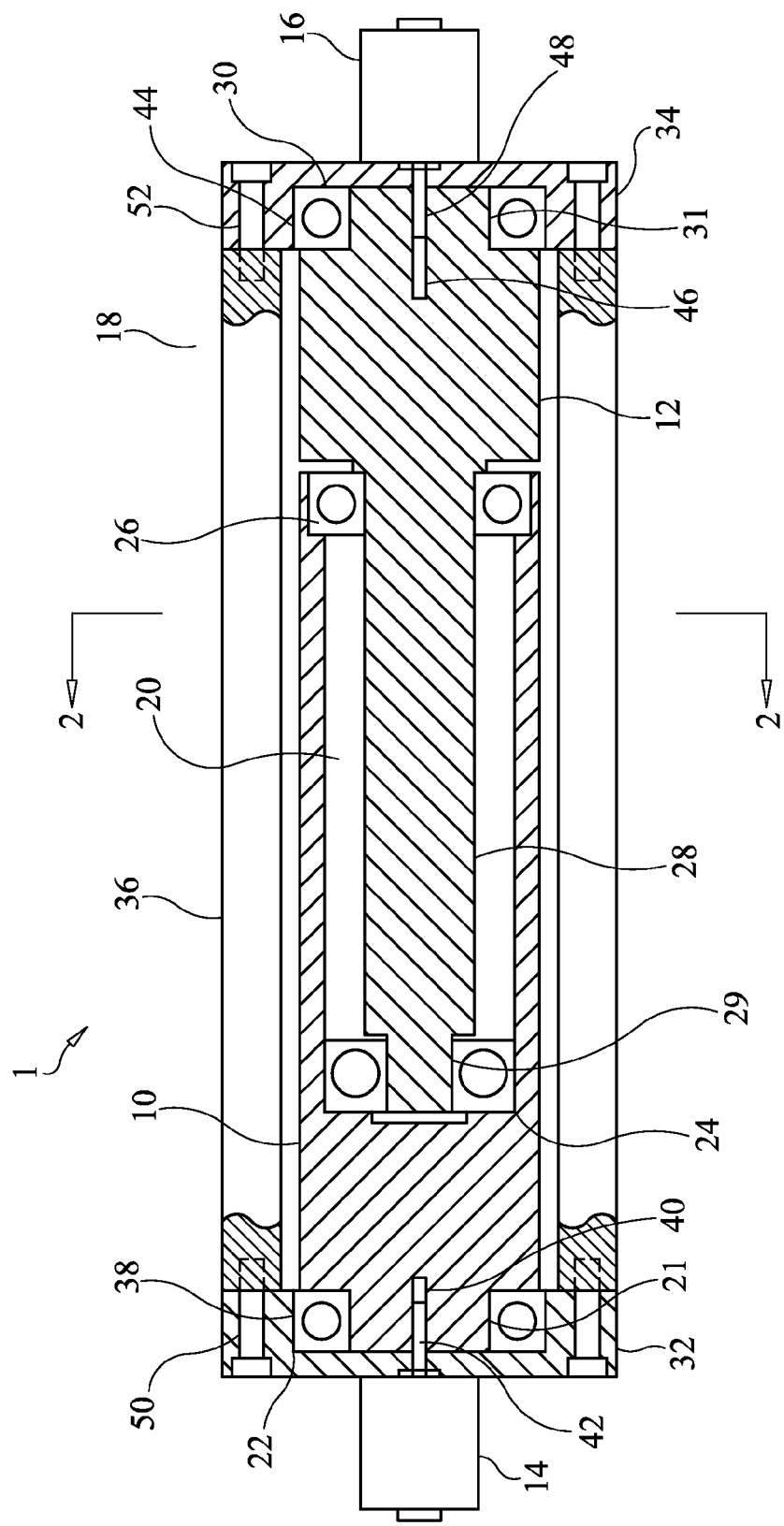
FIG. 1 is a lengthwise cross sectional view of a dual gyroscope system in accordance with the present invention.
Figure 2:
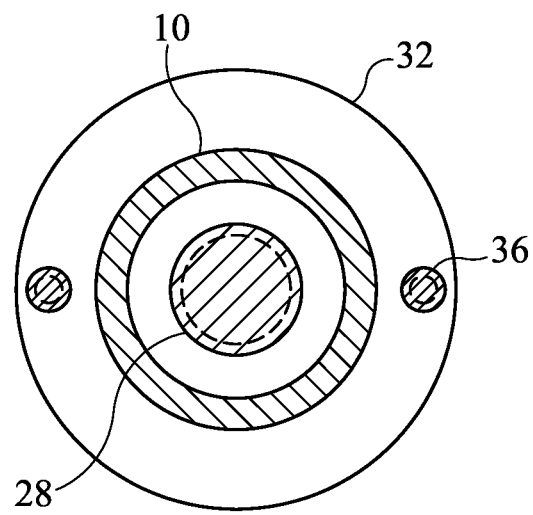
FIG. 2 is a cross sectional view of a dual gyroscope in accordance with the present invention.

With reference now to the drawings, and particularly to FIG. 1, there is shown a lengthwise cross sectional view of a dual gyroscope system 1. With reference to FIG. 2, the dual gyroscope system 1 preferably includes a first rotor 10, a second rotor 12, a first motor 14, a second motor 16 and a support structure 18. The first rotor 10 includes an outer diameter and a rotor bore 20. The rotor bore 20 is formed in one end of the first rotor 10. A first bearing diameter 21 is formed on an opposing end of the first rotor 10. An inner diameter of a first outer bearing 22 is pressed on to the first bearing diameter 21. Preferably, a first bore bearing 24 is pressed into a bottom of the rotor bore 20 and a second bore bearing 26 is pressed into an opening of the rotor bore 20. The second rotor 12 includes a first outer diameter that is preferably the same as the outer diameter of the first rotor 10 and a second outer diameter 28, which is sized to be received by the rotor bore 20. A bearing bore diameter 29 is formed on a distal end of the second outer diameter 28. The bearing bore diameter 29 is sized to receive an inner diameter of the first bore bearing 24. A second bearing diameter 31 is formed on the end of the second rotor 12. An inner diameter of a second outer bearing 30 is pressed on to the second bearing diameter 31. The first and second rotors 10, 12 are sized, such that the angular momentum of the first rotor 10 is equal to the angular momentum of the second rotor 12.

Figure 3:
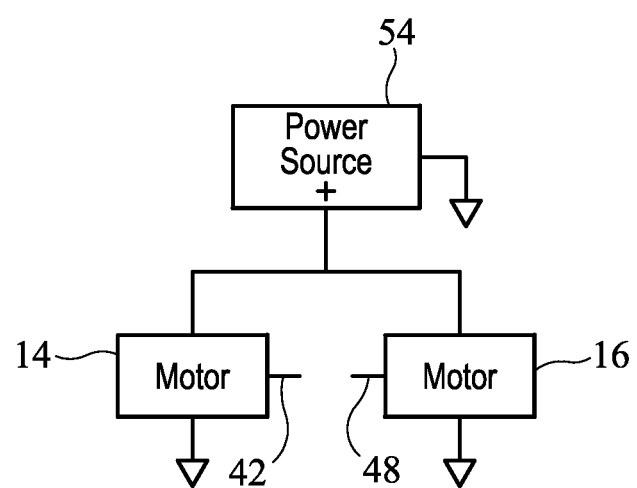
FIG. 3 is a schematic diagram of a power source, a first motor and a second motor of a dual gyroscope in accordance with the present invention.
Figure 4:
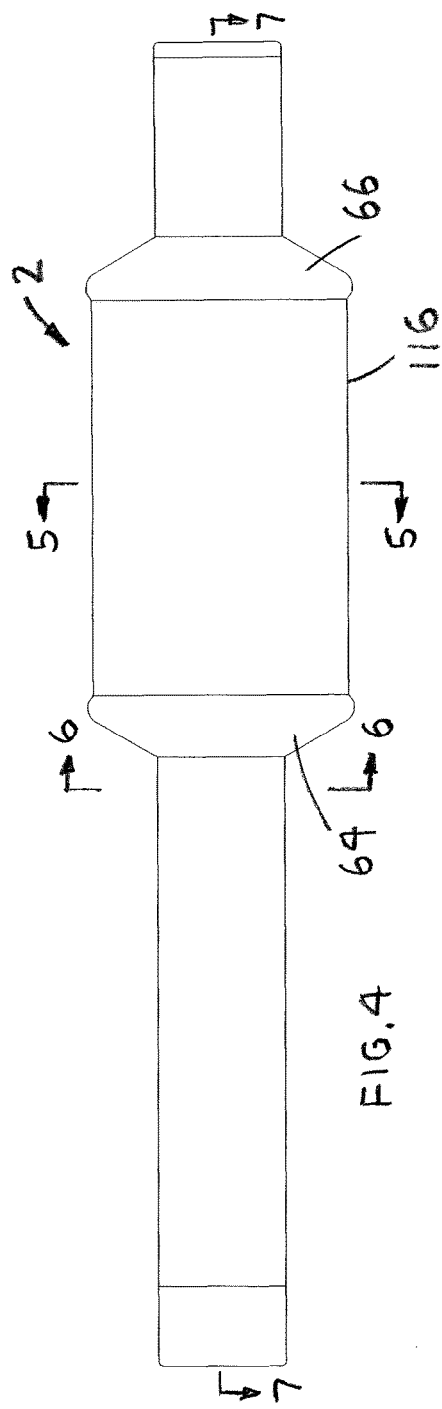
FIG. 4 is a side view of a second embodiment of a dual gyroscope system in accordance with the present invention.
Figure 6:
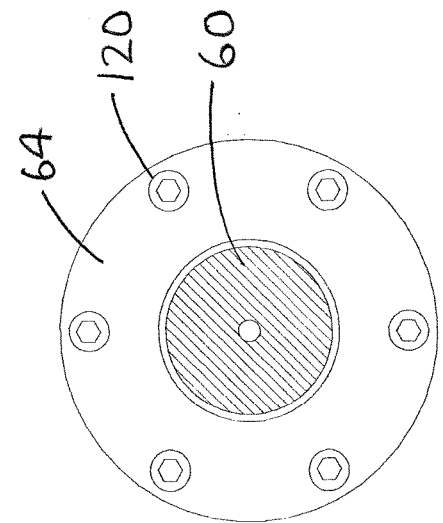
FIG. 6 is a cross sectional view cut through a second embodiment of a dual gyroscope system in FIG. 4 in accordance with the present invention.

The support structure 18 preferably includes a first end plate 32, a second end plate 34 and at least one lengthwise member 36. The first end plate 32 includes a first bearing bore 38 formed in one side thereof and an end of the first motor 14 is attached to an opposing side of the first end plate 32 preferably with fasteners. A first shaft cavity 40 is formed in the opposing end of the first rotor 10 to receive a drive shaft 42 of the first motor 14. The second end plate 34 includes a second bearing bore 44 formed in one side thereof and an end of the second motor is 16 attached to an opposing side of the second end plate 34 preferably with fasteners. A second shaft cavity 46 is formed in the end of the second rotor 12 to receive a drive shaft 48 of the second motor 16. The first end plate 32 is secured to a first end of the at least one lengthwise member 36 with a fastener 50 and the second end plate 34 is secured to a second end of the at least one lengthwise member 36 with a fastener 52. The support structure 18 may be mounted to any object that needs to be stabilized, such as an archery bow. With reference to FIG. 3, an electric power source 54 is used to provide the first and second motors 14, 16 with electric power. Preferably the first and second motors 14, 16 are DC motors powered by a DC electric power source 54. The counter rotating first and second rotors 10, 12 provide a stable dual gyroscope system 1 during electrical power-up and power-down time periods.

With reference to FIGS. 4-7, a second embodiment of a dual gyroscope system 2 preferably includes a first rotor 56, a second rotor 58, a first motor 60, a second motor 62 and a support structure 63. The support structure 63 preferably includes a first end flange 64, a second end flange 66 and a support frame 68. Support structure 63 pivotally retains the first and second rotors 56 and 58 and retains the first and second motors 60, 62. The support frame 68 preferably includes a center section 70, two first end legs 72 and two second end legs 74. The first end legs 72 extend from a first side of the center section 70 and the second end legs 74 extend from a second side of the center section 70. First and second bearing hubs 76, 78 extend from the first and second sides of the center section 70 at a middle thereof. The first and second bearing hubs 76, 78 are sized to receive an inner diameter of the first and second bearings 80, 82. The first rotor 56 includes two first bearing bores 84 disposed in each end to receive the two first bearings 80. The second rotor 58 includes two second bearing bores 86 disposed in each end to receive the two second bearings 82.

A first shaft bore 88 is formed in an outside end of the first rotor 56 to receive a drive shaft 90 of the first motor 60. The drive shaft 90 is preferably retained in the first shaft bore 88 with a set-screw 92. A second shaft bore 94 is formed in an outside end of the second rotor 58 to receive a drive shaft 96 of the second motor 62. The drive shaft 96 is preferably retained in the first shaft bore 94 with a set-screw 98. The first end flange 64 includes a first flange portion 100, a first tubular projection 102 and a first bearing projection 104. The first tubular projection 102 extends from one end of the first flange portion 100 and the first bearing projection 104 extends from an opposing end of the first flange portion 100. An inside perimeter of the first tubular projection 102 is sized to receive the first motor 60. The first bearing projection 104 is sized to receive an inner diameter of the first bearing 80. A drive end of the first motor 60 is attached to the first flange portion 100 with a pair of fasteners 106.

Figure 5:
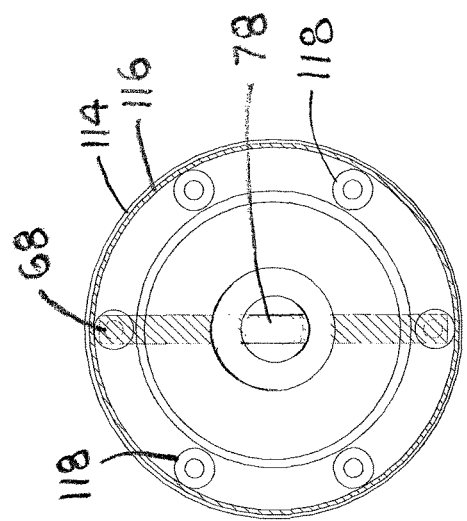
FIG. 5 is a cross sectional view cut through a center of a second embodiment of a dual gyroscope system in FIG. 4 in accordance with the present invention.
Figure 7:
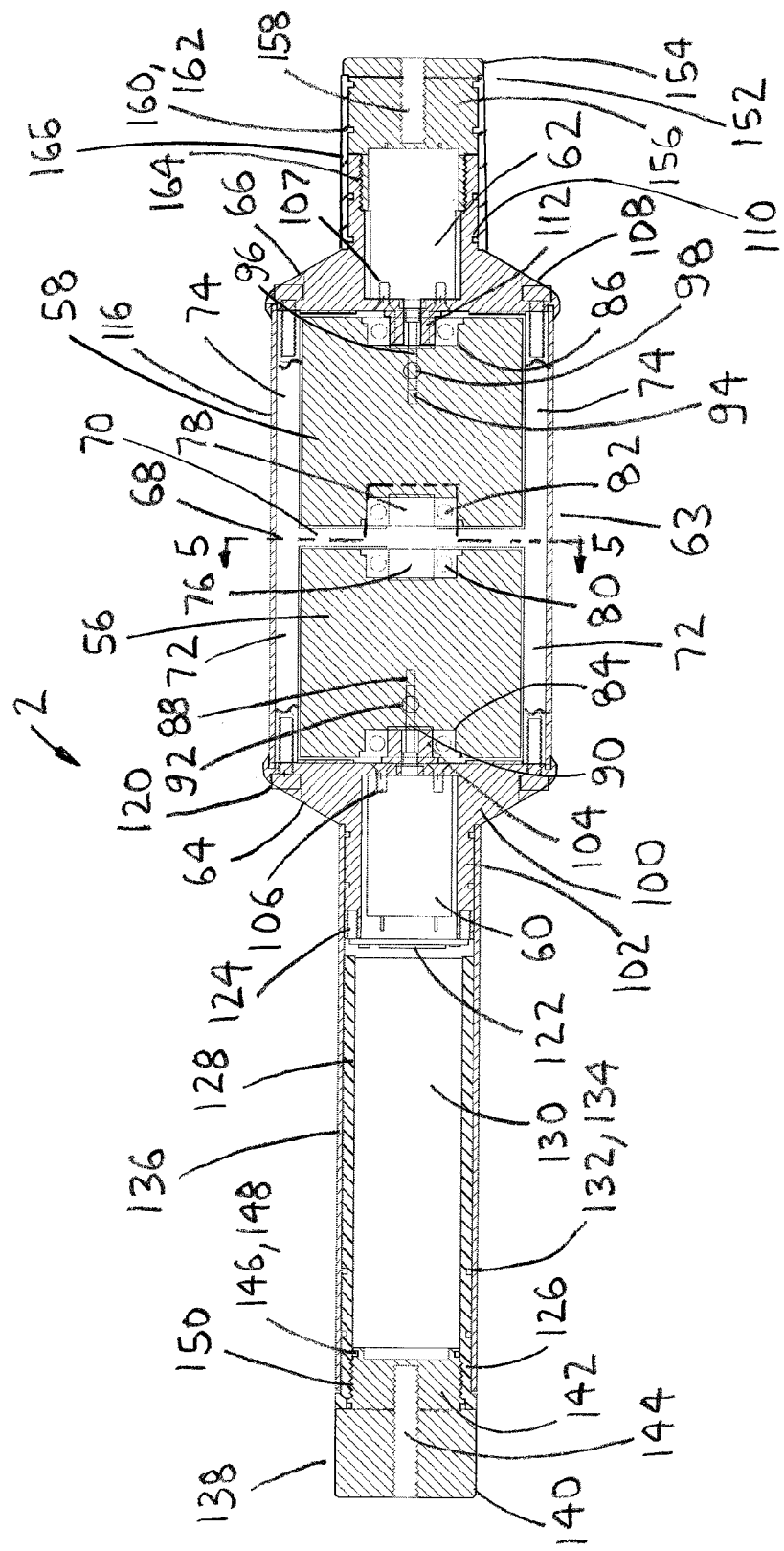
FIG. 7 is a lengthwise cross sectional view cut through a second embodiment of a dual gyroscope system in FIG. 4 in accordance with the present invention.

The second end flange 66 includes a first flange portion 108, a second tubular projection 110 and a second bearing projection 112. The second tubular projection 110 extends from one end of the second flange portion 108 and the second bearing projection 112 extends from an opposing end of the second flange portion 108. An inside perimeter of the second tubular projection 110 is sized to receive the second motor 62. The second bearing projection 112 is sized to receive an inner diameter of the second bearing 82. A drive end of the second motor 62 is attached to the second flange portion 108 with a pair of fasteners 107. With reference to FIG. 5, a sleeve groove 114 is formed in the first and second flange portions 100, 108 to receive each end of a rotor sleeve 116. The rotor sleeve 116 seals the first and second rotors 56, 58. A plurality of fasteners 120 are used to attach the first flange 64 to the first end legs 72 and a first end of a plurality of spacer rods 118. The plurality of fasteners 120 are used to attach the second flange 66 to the second end legs 74 and a second end of the plurality of spacer rods 118.

An electronic control board 122 is attached to an end of the first tubular projection 102 of the first end flange 64 with two fasteners 124. A battery tube 126 includes an inner perimeter 128, which is sized to retain a battery 130. A plurality of o-ring grooves 132 are formed in an outer perimeter of the first tubular projection 102 and the battery tube 126. The plurality of o-ring grooves 132 are sized to receive a plurality of o-rings 134. An inner perimeter of a connection 136 is sized to receive the outer perimeter of the first tubular projection 102 and the battery tube 126. The connection sleeve 136 is used to secure one end of the battery tube 126 to the end of the first tubular projection 102. The connection sleeve 136 is also secured to the first tubular projection 102 and the battery tube 126 with adhesive or the like.

Figure 8:
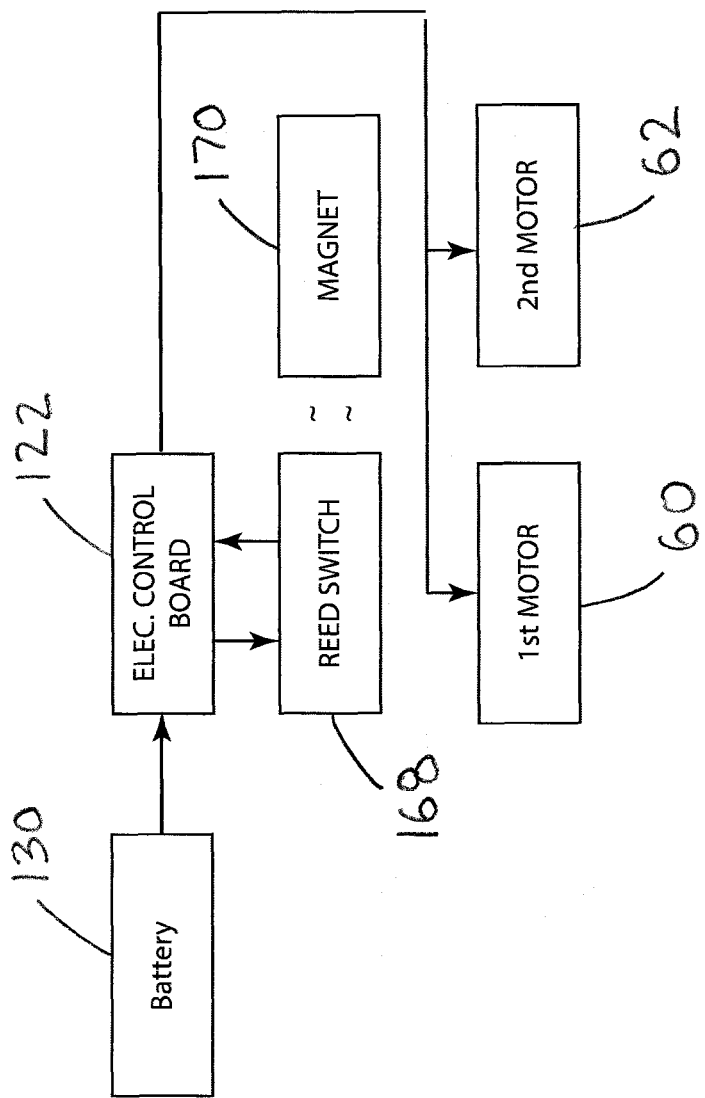
FIG. 8 is a schematic diagram of an electronic circuit board, connected to a battery and the first and second motors of a second embodiment of a dual gyroscope in accordance with the present invention.

A battery end cap 138 preferably includes a base portion 140, a threaded portion 142 and a fastener 144. The fastener 144 is used to join the threaded portion 142 to the base portion 140. A plurality of o-ring grooves 146 are formed in an outer perimeter of the threaded portion 142 to receive a plurality of o-rings 148. An opposing end of the battery tube 126 includes an inner thread 150, which is sized to threadably engage the threaded portion 142. A motor end cap 152 preferably includes a base portion 154, a threaded portion 156 and a fastener 158. The fastener 158 is used to join the threaded portion 156 to the base portion 154. A plurality of o-ring grooves 160 are formed in an outer perimeter of the threaded portion 156 and the second tubular projection 110 to receive a plurality of o-rings 162. The second tubular projection 110 includes an inner thread 164, which is sized to threadably engage the threaded portion 156. A cover sleeve 166 is sized to receive an outer diameter of the threaded portion 156 and the second tubular projection 110. The cover sleeve 166 is also secured to the threaded portion 156 and the second tubular projection 110 with adhesive or the like. With reference to FIG. 8, the electronic control board 122 includes a reed switch 168. Electrical power is supplied from the battery 130 to the two motors through the electronic control board 122. The reed switch 168 acts as an on-off switch. The reed switch 168 is turned-on by holding a magnet 170 adjacent the location of the reed switch 168 for 2-3 seconds. The electronic control board 122 will receive feedback from a closed reed switch 168 and supply electrical power to the first and second motors, after 2-3 seconds. The reed switch 168 and the plurality of o-rings 134, 148, 162 allow the dual gyroscope system 2 to be submersible in water.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A dual opposing rotation gyroscope stabilization system comprising:
    a first rotor and a second rotor;
    a support structure having a first end and a second end, said first rotor is rotatably retained on said first end of said support structure, said second rotor is rotatably retained on said second end of said support structure;
    a first motor is secured to said first end of said support structure;
    a second motor is secured to said second end of said support structure;
    said first rotor having a rotor bore formed in one end, said second rotor having a first outer diameter and a second outer diameter, said second outer diameter extends from said first outer diameter, said second outer diameter extends into said rotor bore; and
    said second outer diameter is rotatably engaged with said rotor bore with at least one bearing.

2. The dual opposing rotation gyroscope stabilization system of claim 1 wherein:
    said second rotor is rotatably engaged with said first rotor.

3. The dual opposing rotation gyroscope stabilization system of claim 1 wherein:
    one end of said first rotor is rotatably engaged with said first end of said support structure with a first outer bearing; and
    one end of said first outer diameter of said second rotor is rotatably engaged with said second end of said support structure with a second outer bearing.

4. The dual opposing rotation gyroscope stabilization system of claim 3 wherein:
    said first motor is secured to said first end of said support structure, a drive shaft of said first motor is engaged with said first rotor; and
    said second motor is secured to said second end of said support structure, a drive shaft of said second motor is engaged with said second rotor.

5. The dual opposing rotation gyroscope stabilization system of claim 1, further comprising:
    an electric power source for supplying said first and second motors with electrical power.

6. A dual opposing rotation gyroscope stabilization system comprising:
    a first rotor;
    a second rotor having an angular momentum that is equal to substantially an angular momentum of said first rotor;
    a support structure includes a first end and a second end, said first rotor is rotatably retained on said first end of said support structure, said second rotor is rotatably retained on said second end of said support structure;
    a first motor is secured to said first end of said support structure;
    a second motor is secured to said second end of said support structure;
    said first rotor having a rotor bore formed in one end, said second rotor having a first outer diameter and a second outer diameter, said second outer diameter extends from said first outer diameter, said second outer diameter extends into said rotor bore; and
    said second outer diameter is rotatably engaged with said rotor bore with at least one bearing.

7. The dual opposing rotation gyroscope stabilization system of claim 6 wherein:
    said second rotor is rotatably engaged with said first rotor.

8. The dual opposing rotation gyroscope stabilization system of claim 6 wherein:
    one end of said first rotor is rotatably engaged with said first end of said support structure with a first outer bearing; and
    one end of said first outer diameter of said second rotor is rotatably engaged with said second end of said support structure with a second outer bearing.

9. The dual opposing rotation gyroscope stabilization system of claim 8 wherein:
    said first motor is secured to said first end of said support structure, a drive shaft of said first motor is engaged with said first rotor; and
    said second motor is secured to said second end of said support structure, a drive shaft of said second motor is engaged with said second rotor.

10. The dual opposing rotation gyroscope stabilization system of claim 6, further comprising:
    an electric power source for supplying said first and second motors with electrical power.

11. A dual opposing rotation gyroscope stabilization system comprising:
    a first rotor and a second rotor;
    a support structure having a first end and a second end, said first rotor is rotatably retained on said first end of said support structure, said second rotor is rotatably retained on said second end of said support structure;
    a first motor is secured to said first end of said support structure, wherein said first motor rotates said first rotor in one direction;

a second motor is secured to said second end of said support structure, wherein said second motor rotates said second rotor in a direction opposite to said first rotor;

said first rotor having a rotor bore formed in one end, said second rotor having a first outer diameter and a second outer diameter, said second outer diameter extends from said first outer diameter, said second outer diameter extends into said rotor bore; and said second outer diameter is rotatably engaged with said rotor bore with at least one bearing.

12. The dual opposing rotation gyroscope stabilization system of claim 11 wherein:

said second rotor is rotatably engaged with said first rotor.

13. The dual opposing rotation gyroscope stabilization system of claim 11 wherein:

one end of said first rotor is rotatably engaged with said first end of said support structure with a first outer bearing; and one end of said first outer diameter of said second rotor is rotatably engaged with said second end of said support structure with a second outer bearing.

14. The dual opposing rotation gyroscope stabilization system of claim 13 wherein:

said first motor is secured to said first end of said support structure, a drive shaft of said first motor is engaged with said first rotor; and said second motor is secured to said second end of said support structure, a drive shaft of said second motor is engaged with said second rotor.

15. The dual opposing rotation gyroscope stabilization system of claim 11, further comprising:

an electric power source for supplying said first and second motors with electrical power.

* * * * *